US008866606B1

(12) United States Patent  
Will et al.

(10) Patent No.: US 8,866,606 B1  
(45) Date of Patent: Oct. 21, 2014

(54) SYSTEMS AND METHODS FOR AUTOMATED PERSONAL EMERGENCY RESPONSES

(71) Applicants: Travis E. Will, Renton, WA (US); Russell E. VanDevanter, Seattle, WA (US); Steven M. Myhre, Seattle, WA (US); Michael J. Myhre, Monroe, WA (US)

(72) Inventors: Travis E. Will, Renton, WA (US); Russell E. VanDevanter, Seattle, WA (US); Steven M. Myhre, Seattle, WA (US); Michael J. Myhre, Monroe, WA (US)

(73) Assignee: Rockwilli RMR LLC, Renton, WA (US)

( * ) Notice: Subject to any disclaimer, the term of this patent is extended or adjusted under 35 U.S.C. 154(b) by 0 days.

(21) Appl. No.: 14/023,457

(22) Filed: Sep. 10, 2013

Related U.S. Application Data

(63) Continuation-in-part of application No. 13/942,833, filed on Jul. 16, 2013, and a continuation-in-part of application No. 29/466,495, filed on Sep. 9, 2013, now Pat. No. Des. 696,223.

(51) Int. Cl.
*G08B 1/08* (2006.01)
*H04W 4/22* (2009.01)

(52) U.S. Cl.
CPC ............................... *H04W 4/22* (2013.01)
USPC ............ 340/539.11; 340/539.12; 340/539.13; 340/539.19; 455/404.1; 455/404.2; 455/417; 455/418; 455/456.1; 455/457; 455/563; 455/567; 704/270; 704/270.1; 704/231; 704/274; 704/278

(58) Field of Classification Search
None
See application file for complete search history.

(56) References Cited

U.S. PATENT DOCUMENTS

| | | | | |
|---|---|---|---|---|
| 5,648,760 | A * | 7/1997 | Kumar | 340/4.4 |
| 6,298,247 | B1 * | 10/2001 | Alperovich et al. | 455/558 |
| 6,608,559 | B1 * | 8/2003 | Lemelson et al. | 340/539.13 |
| 6,711,543 | B2 * | 3/2004 | Cameron | 704/270 |
| 7,245,216 | B2 * | 7/2007 | Burkley et al. | 340/539.13 |
| 8,135,378 | B2 * | 3/2012 | Yasrebi et al. | 455/404.1 |
| 2004/0033819 | A1 * | 2/2004 | Hymel | 455/567 |
| 2004/0246128 | A1 * | 12/2004 | Menard | 340/539.19 |
| 2007/0111716 | A1 * | 5/2007 | Leigh et al. | 455/417 |
| 2011/0117878 | A1 * | 5/2011 | Barash et al. | 455/404.2 |
| 2012/0036461 | A1 * | 2/2012 | Parkulo et al. | 715/769 |
| 2012/0092156 | A1 * | 4/2012 | Tran | 340/539.12 |
| 2013/0120132 | A1 * | 5/2013 | Hicks, Iii | 340/501 |
| 2013/0141235 | A1 * | 6/2013 | Utter, Ii | 340/539.12 |
| 2013/0307685 | A1 * | 11/2013 | Sholder | 340/539.12 |

\* cited by examiner

*Primary Examiner* — Mohammad Ghayour
*Assistant Examiner* — Adnan Aziz
(74) *Attorney, Agent, or Firm* — Puget Patent; Michael Gibbons

(57) ABSTRACT

A subscriber device for use in an automated personal emergency response system implemented as a conference bridge on a remote computing network. The device, intended to be worn as a pendant, wristband or in another wearable configuration, includes a color high-resolution display for signaling a user of the subscriber device with notifications, arrows for directional guidance, and/or other status messages. The device also includes microphones and speakers for enabling a teleconference between a user of the subscriber device in need of assistance and parties joined to the teleconference via the automated personal emergency response system. The user of the subscriber device may initiate the call for assistance and teleconference via a press of a single button on the device; alternatively, accelerometers in the device may detect a fall and automatically initiate the call. The device can receive medical telemetry and provide it to conference participants and perform home automation tasks.

22 Claims, 9 Drawing Sheets

FIG. 2

| Alarm Event | Response(s) | Contact Person(s) |
|---|---|---|
| Emergency | 1. Initiate Conference Network | 1. Emergency Dispatch |
| Fall Detector | 1. Interact With Subscriber Device;<br>2. If "OK" Status Confirmed, Conclude Alarm Event; Else, Initiate Conference Network. | 1. Caretaker;<br>2. If No Response, First Family Member;<br>3. If No Response, Emergency Dispatch. |
| Frightened | 1. Initiate Conference Network | 1. First Family Member and Caretaker;<br>2. If No Response, Emergency Dispatch. |
| Health Concern | 1. Initiate Conference Network. | 1. Caretaker;<br>2. If No Response, Primary Care Doctor;<br>3. If No Response, First Family Member. |
| Locked Out of House | 1. Interact with Auxiliary Device;<br>2. If Unlock Successful, Conclude Alarm Event; Else, Initiate Conference Network. | 1. Property Manager;<br>2. If No Response, Neighbor;<br>3. If No Response, First Family Member;<br>4. If No Response, Control Center. |
| Need Directions | 1. Instruct Device to Navigate to a Waypoint;<br>2. If Navigation Successful, Conclude Alarm Event; Else, Initiate Conference Network. | 1. First Family Member;<br>2. If No Response, Second Family Member;<br>3. If No Response, Control Center. |
| Need Transportation | Initiate Conference Network. | 1. First Family Member;<br>2. If No Response, Second Family Member;<br>3. If No Response, Control Center. |
| Smoke Alarm | 1. Send Status Check to Auxiliary Device.<br>2. If "OK" Status Confirmed, Conclude Alarm Event; Else, Initiate Conference Network. | 1. Emergency Dispatch |
| Vital Sign Monitor | 1. Initiate Conference Network | 1. Caretaker and Emergency Dispatch. |

SYSTEMS AND METHODS FOR AUTOMATED PERSONAL EMERGENCY RESPONSES

PRIORITY CLAIM

This application constitutes a continuation-in-part application of U.S. patent application Ser. No. 13/942,833, entitled SYSTEMS AND METHODS FOR AUTOMATED PERSONAL EMERGENCY RESPONSES, naming TRAVIS E. WILL; RUSSELL E. VANDEVANTER; STEVEN M. MYHRE; and MICHAEL J. MYHRE as inventors, filed Jul. 16, 2013, which is currently co-pending; and constitutes a continuation-in-part application of design patent application No. 29/466,495, entitled ALERTING DEVICE, naming TRAVIS E. WILL; RUSSELL E. VANDEVANTER; STEVEN M. MYHRE; and MICHAEL J. MYHRE as inventors, filed Sep. 9, 2013, which is currently co-pending. The foregoing applications are hereby incorporated by reference in their entirety as if fully set forth herein.

FIELD OF THE INVENTION

The present disclosure relates generally to personal emergency response systems, and more specifically, to automated personal emergency response systems, methods for responding to personal emergency response system alarm events, and methods for managing care for subscribers to a personal emergency response system.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Personal emergency response systems are alarm systems designed to summon emergency medical personnel in the event of an emergency. Elderly people and disabled people who live alone commonly use personal emergency response systems. Personal emergency response systems are typically monitored by a central control center. Users typically must subscribe to services offered by personal emergency response system monitoring service providers.

In cases of emergency, such as after a fall or a suddenly appearing ailment, a subscriber of a personal emergency response system can trigger an alarm event by pressing a button on a subscriber device. Typical subscriber devices include pendants worn around the neck, wristbands, or other devices that are carried by a subscriber. The device typically has a wireless transmitter that can be activated by the subscriber in the event of an emergency.

In some systems, when an alarm event is triggered, the transmitter sends an alarm to a central monitoring station. Medical personnel are then dispatched to the site where the alarm was activated. In other systems, there is no central monitoring system, and the subscriber simply programs the numbers of family members, neighbors, or local emergency responders.

Monitoring services for personal emergency response systems generally consist of a call center staffed by trained professionals. These professionals are available at all times to receive calls. Some monitoring services employ trained medical staff as call center operators, which enables the monitoring service to better evaluate a subscriber's medical requests. Monitoring services can be quite expensive, thereby driving up the cost of subscribing to a personal emergency response system.

Some personal emergency response systems are used not only for emergencies, but also as a means to conveniently ask questions about concerning symptoms, or for help with day-to-day activities such as shopping, cleaning, or to arrange for transportation.

Those skilled in the art will appreciate that personal emergency response systems can be used for a multitude of applications. However, the cost of monitoring services can limit the scope of services offered. There exists, therefore, a need for a more cost effective means for providing comprehensive personal emergency response system services. Additionally, there exists a need for a personal emergency response system that recognizes various types of alarm events and directs the various alarm events to the appropriate party or parties.

Those skilled in the art will further appreciate that access to information about a subscriber and the subscriber's health conditions can enable medical professionals, caregivers, family members, and emergency response teams to be more responsive in a given situation. Despite advances in technology, personal medical information tends to be fragmented among several parties. This is especially true for medical information that is not formally documented. For example, friends, family members, or caregivers may acquire an intimate awareness of a person's medical history based on an accumulation of knowledge over a period of ongoing interactions. Other medical professionals may not have access to this information unless there is an opportunity to converse directly with such friends, family members, or caregivers. Similarly, medical professionals have knowledge and information that could benefit or improve the effectiveness of the day-to-day care activities provided by such friends, family members, or caregivers. Furthermore, information can be obtained from various auxiliary devices used to monitor the health status of a patient or environmental factors around the patient's residence. This information, however, is not readily accessible by parties in remote locations. Given these shortcomings, there exists a need for a personal emergency response system that enables the sharing of information in order to help personal emergency response system responders to be more responsive to various situations in which personal emergency response systems can be used.

These and other problems concerning personal emergency response systems represent long-felt yet unmet needs. Therefore, systems and methods for solving the aforementioned problems are desirable. The embodiments disclosed herein have the potential to provide meaningful benefits to subscribers of personal emergency response systems, health care providers, physicians, insurance companies, emergency dispatch centers, and personal emergency response system service providers.

SUMMARY

A summary of certain embodiments disclosed herein is set forth below. It should be understood that these aspects are presented merely to provide the reader with a brief summary of these certain embodiments and that these aspects are not intended to limit the scope of this disclosure.

Embodiments of the present disclosure relate generally to personal emergency response systems, and more specifically, to automated personal emergency response systems, methods for responding to personal emergency response system alarm events, and methods for managing care for subscribers to a personal emergency response system.

In some embodiments, an automated personal emergency response system comprises an alarm server, a response server, and a data warehouse. The alarm server may be configured to detect alarm events from one or more subscriber devices, to ascertain the nature of an alarm event based on a plurality of alarm event types, and to trigger one or more responses to an alarm event.

In a preferred embodiment, the response server is configured to allow two-way communications and data transmissions among one or more parties and a subscriber device. In some embodiments, the personal emergency response system is configured to enable remotely interacting with one or more auxiliary devices.

In some embodiments, the personal emergency response system is configured to ascertain a class of one or more parties based on the nature of the alarm event, and to give notice to the one or more parties, the notice comprising instructions to join a conference network.

In some embodiments, a computer-implemented method for responding to a personal emergency response system alarm event comprises detecting an alarm event from a subscriber device, ascertaining the nature of the alarm event based on a plurality of alarm event types, and triggering one or more responses to the alarm event. In a preferred embodiment, the one or more responses depend on the nature of the alarm event.

In some embodiments, a computer-implemented method for managing care for a subscriber of a personal emergency response system comprises registering a subscriber device that is configured to enable two-way communications and data transmissions among one or more parties and the subscriber device, designating a plurality of alarm event types, and designating for each alarm event type, one or more responses to be triggered when an alarm event is detected, the one or more responses depending on the nature of the alarm event.

In some embodiments, a subscriber device comprises an article of manufacture including at least a user interface module; a communications module; an audio module; a positional awareness module; a control module; and a power module. In a preferred embodiment, the subscriber device is configured for transmitting alarm events to the alarm server, facilitating two-way communications and data transmissions between the subscriber device and one or more parties, and receiving registration data.

In addition to the foregoing, various other methods, systems, and non-transitory computer-readable media are set forth and described in the teachings of the present disclosure.

The foregoing summary may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings, claims, and the following detailed description.

DESCRIPTION OF THE DRAWINGS

FIG. 2 shows a table detailing one embodiment of various responses to various personal emergency response system alarm events.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
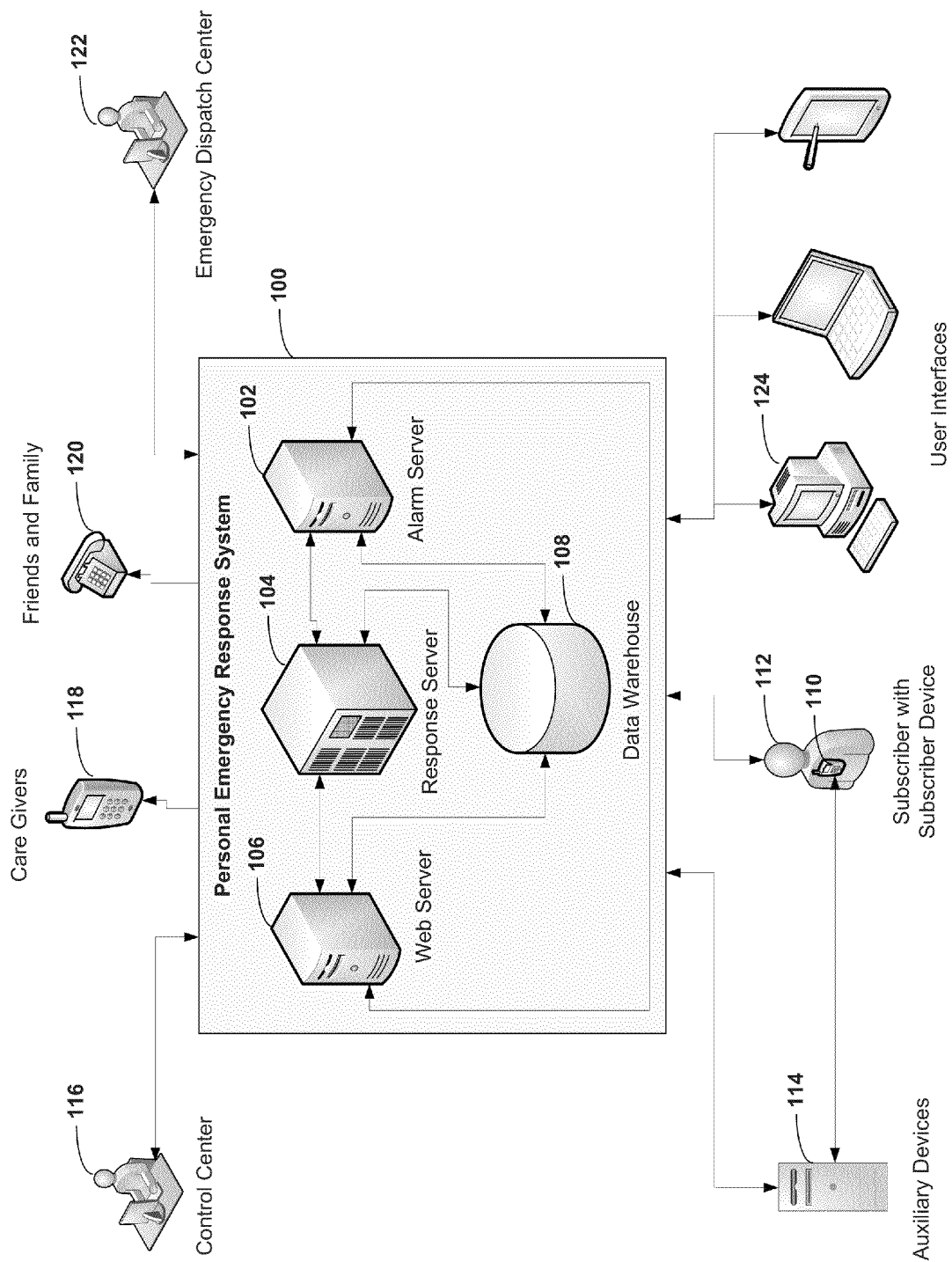
FIG. 1 shows an exemplary embodiment of a personal emergency response system.

FIG. 1 shows an exemplary embodiment of a personal emergency response system 100. Those skilled in the art will appreciate that numerous other embodiments of personal emergency response systems are within the spirit and scope of the disclosure herein.

The embodiment shown in FIG. 1 comprises an alarm server 102, a response server 104, a web server 106, and a data warehouse 108. The alarm server 102, the response server 104, and the web server 106 may be configured to interact with the data warehouse 108, and with one another.

The personal emergency response system 100 is configured to interact with subscriber devices 110 worn or carried by subscribers 112. A subscriber device may be a handheld mobile cellular, personal communication service, or other wireless communications device. In a preferred embodiment, a single dedicated button on the subscriber device may be used to alert the personal emergency response system of the occurrence of an alarm event. The subscriber device may also have a plurality of buttons, with different buttons configured to trigger different alarm events. In some embodiments, the subscriber device is configured to automatically trigger an alarm event. For example, the subscriber device may trigger an alarm event upon the occurrence of a specified condition. In some embodiments, a subscriber device may be equipped with one or more sensors which may be configured to trigger alarm events.

In some embodiments, a subscriber device may have a visual display screen that may be configured to enable tactile or touch-screen interactions with various menu options. In some embodiments, a subscriber device may be configured to enable a subscriber to interact with the subscriber device through audible voice prompts. For example, a subscriber device may be configured to allow a subscriber to initiate an alarm event simply by calling out the word "HELP!" or by calling out some other word associated with an alarm event. Even if the subscriber device is not connected to the personal emergency response system at the time of an audible voice prompt, the subscriber device may be configured to automatically establish a connection, trigger an alarm event, and transmit data to the personal emergency response system, including the content of the audible voice prompt and contemporaneous audio. In some embodiments, a subscriber device may be equipped with video communications functionalities such that a subscriber may engage in video conferencing with other parties. Video conferencing may be initiated upon the occurrence of an alarm event, or parties initiate video conferencing with a subscriber to check-in or casually communicate with the subscriber. Since many subscribers of personal emergency response systems are elderly and may have difficulty hearing or seeing, it is advantageous to provide subscriber devices having visual and audible methods of interacting.

In a preferred embodiment of the personal emergency response system 100, the alarm server 102 is configured to detect alarm events from one or more subscriber devices 110, to ascertain the nature of an alarm event based on a plurality of alarm event types, and to trigger one or more responses to an alarm event. In a preferred embodiment, the responses triggered by the alarm server 102 depend on the nature of the alarm event. In a preferred embodiment, no human operator is needed to detect an alarm event and trigger responses to the alarm event. Those skilled in the art will recognize that the alarm server may be connected to a subscriber device using mobile cellular, personal communication service, web-based wireless network, or other wireless communications technologies. In some embodiments, a continuous connection may be maintained between the alarm server and a subscriber device. This may be advantageous in situation where continuous, real-time monitoring is desirable, for example, where a subscriber suffers from a physical or mental health condition that should not go unmonitored. In alternative embodiments, a connection between the alarm server and a subscriber device may be periodic or intermittent. In situations where continuous monitoring is infeasible, expensive, or unnecessary, periodic or intermittent connections between the alarm server and a subscriber device may be appropriate.

In a preferred embodiment, the personal emergency response system 100 is configured to receive data transmitted from subscriber devices. The data may be recorded and stored in the data warehouse 108. Data may be continuously or intermittently transmitted from subscriber devices. Data transmitted from subscriber devices may include configuration information, subscriber status information, such as GPS location or "safety switch" check-ins, and may also include information associated with an auxiliary device.

Recording functionalities may be incorporated into a subscriber device, or data transmitted from the subscriber device may be recorded at the personal emergency response system. The connections between the personal emergency response system and the subscriber devices, whether continuous or intermittent, facilitate the recording and storing of data. In an alternative embodiment, a connection between the personal emergency response system and a subscriber device may be established via a local network with an internet connection, thereby enabling data to be transmitted from the subscriber device and stored in the data warehouse 108. In some embodiments, the web server 106 may enable the connection between the personal emergency response system and a subscriber device.

In the embodiment of the personal emergency response system 100 shown in FIG. 1, the response server 104 is configured to carry out one or more responses to an alarm event. In some embodiments, the alarm server 102 triggers the response server 104 to carry out responses to an alarm event. Those skilled in the art will appreciate that the alarm server 102 and the response server 104 may be configured to interact with one another via computer program functionalities.

In some embodiments, upon the occurrence of an alarm event the personal emergency response system is configured to give notice to one or more parties to join a conference network. The one or more parties may be pre-defined, and may vary depending on the nature of the alarm event. The notice to join a conference network may be provided by telephone call, automated voice messaging, text message, e-mail, or similar means. Once one or more parties join the conference network, in a preferred embodiment, the response server 104 is configured to allow two-way communications and data transmissions among one or more parties and a subscriber device 110. Two-way communications may be facilitated among multiple parties using a private branch exchange, telephone trunk conference bridge, or other telephone exchange or network. These technologies are advantageous because they enable multiple parties to each talk and listen to one another. In some embodiments, some or all of the parties to the conference network may be able to mute one another or perform other in-conference functionalities.

In various embodiments, the parties that may be included in a conference network comprise a control center 116, or control center personnel, such as the type which provides monitoring services for the personal emergency response system; care givers 118, such as those which provide subscribers 110 with day-to-day care, as well as primary care doctors and other medical service providers; friends and family 120, including neighbors, immediate family members, or close friends that a subscriber 112 tends to rely on for addressing various needs and concerns; and an emergency dispatch center, such as a 911 dispatch center, public safety answering point, or public safety access point. In a preferred embodiment, an emergency dispatch center 122 will be staffed with operators trained to obtain relevant information from callers necessary to dispatch appropriate emergency services. Those skilled in the art will appreciate that in addition to the aforementioned parties, the personal emergency response system 100 of FIG. 1 may be configured to allow two-way communications and data transmissions among a multitude of other parties.

In a preferred embodiment, the personal emergency response system 100 includes audio recording functionalities. Audio may be recorded from the subscriber device, including the subscriber's voice and surrounding sounds, as well as the audio from any of the parties that join the conference network. In some embodiments, audio is recorded from the moment an alarm event is triggered and continuing until the conclusion of the alarm event.

The embodiment of the personal emergency response system 100 shown in FIG. 1 is also configured to remotely interact with one or more auxiliary device 114. Auxiliary devices may include healthcare systems and devices, home automation systems and devices, and other systems and devices that may be used by a subscriber or provided to a subscriber by a care provider, friend or family member, or personal emergency response system service provider in order to improve the level of monitoring services provided to the subscriber or to integrate the services provided to the subscriber with other complimentary services. Healthcare systems and devices may include glucose monitors, dosimeters, heart monitors, wave form monitors, pacemakers, oximeters, dosimeters, blood glucose monitors, and other systems and devices for monitoring a subscriber's vital signs and health status. Home automation systems and devices may include alarm systems, automatic door locks, automatic outlets, and climate control systems and devices.

Interactions with an auxiliary device may be continuous or periodic, and may occur as a response to an alarm event or in connection with monitoring an auxiliary device. In some embodiments, the existence of a certain condition associated with an auxiliary device will trigger alarm event. In some embodiments, information may be transmitted from an auxiliary device to the personal emergency response system. Similarly, information may be transmitted from the personal emergency response system to an auxiliary device.

An auxiliary device may be accessible to the personal emergency response system 100 through a wireless network, with a connection directly to the personal emergency response system. Alternatively, an auxiliary device may connect direct to a subscriber device 110, with the subscriber device 110 having a connection directly to the personal emergency response system 100. In some embodiments, an auxiliary device may be connected to a subscriber device using a wireless personal area network, such as wireless USB, Bluetooth, Z-Wave, ZigBee, or other low power radio frequency connection. In alternative embodiments, an auxiliary device may be connected directly to the personal emergency response system using a mobile cellular, personal communication service, web-based wireless network, or other wireless communications technologies.

The personal emergency response system 100 may also be configured to interact with various user interfaces 124. In a preferred embodiment, the user interfaces 124 interact with the personal emergency response system 100 through the web server 106. User interfaces 124 may be configured to enable a multitude of interactions with the personal emergency response system. Through a user interface, subscribers may register and configure a subscriber device, and make changes to the configuration, and interact with subscriber settings for the personal emergency response system. These configurations and settings may be transmitted to the subscriber device through the connection between the subscriber device and the personal emergency response system, or through a wireless connection between the subscriber device and a local area network connection to the Internet.

In some embodiments, user interfaces may be configured to enable other users to interact with subscriber settings. For example, user interfaces may enable access for a subscriber's care givers, friends and family, or call center operators at a monitoring service for the personal emergency response system. In a preferred embodiment, a user interface is made available to enable control center operators, care givers, friends and family, or emergency dispatch operators, or other parties to interact with the subscriber, subscriber device, or auxiliary device in response to an alarm event. A user interface may also be configured to review data associated with a subscriber device that has been stored in the data warehouse 108. In a preferred embodiment, subscriber data may be displayed in a user interface with a "dashboard" format with options to "drill-down" to view increasingly more detailed information.

In some embodiments, a user interface may be deployed using web-based technologies. For example, a user interface may be accessible on a web page by any computing device with a web browser and an Internet connection. Alternatively, a user interface may consist of a mobile phone application, making the personal emergency response system accessible by a handheld mobile phone, tablet computer, or other wireless communications device.

In other embodiments, a user interface may utilize dual-tone multi-frequency signaling, such as touch-tone dialing to enable a party to interact with the personal emergency response system using a telephone having push-button telephone keypad functionality. Those skilled in the art will appreciate that various other multi-frequency signaling technologies or pulse dialing technologies may be employed. Alternatively, similar user interfaces may enable parties to interact with the personal emergency response system using a digital keypad, such as on a mobile phone. Various commands may be associated with certain buttons on the keypad, or users may be provided with menu options, and certain buttons on the keypad maybe used to select from among the options.

FIG. 2 shows a table detailing one embodiment of various responses to various personal emergency response system alarm events. Those skilled in the art will appreciate that numerous other embodiments, including a multitude of alternative alarm events, responses, response sequences, contact persons, and contact sequences are within the spirit and scope of the disclosure herein.

In some embodiments, responses to an alarm event include initiating a conference network, interacting with the subscriber device, interacting with an auxiliary device, recording alarm event content, and concluding the alarm event. An alarm event may be assigned one or more responses. Multiple responses to an alarm event may be carried out concurrently, or in sequence. Various responses and contact persons associated with alarm events may be designated using a user interface 124.

In some embodiments, an alarm event triggers personal emergency response system to initiate a conference network. The conference network may be initiated immediately in response to an alarm event, or the conference network may be initiated subsequent to or concurrently with other responses. As shown in the embodiment described in FIG. 2, one or more contact persons may be given notice to join the conference network. In a preferred embodiment, the one or more parties to whom notice is given to join a conference network comprise the one or more parties that are preferred to respond to the alarm event. A party may be preferred to respond to an alarm event for a variety of reasons, including the expected timeliness of a response, the ability to provide an appropriate response, a party's skills and experiences relative to the nature of the alarm event, the party's relation to the subscriber, a party's known schedule or availability, or a party's physical location relative to the subscriber. Additionally, a party may be preferred to respond to an alarm event based on the relative cost of having such party respond as compared to alternative parties. Multiple parties may be given notice to join a conference network concurrently, or in sequence. Notification sequences may include groups of parties to be notified concurrently at one or more stages in the sequence.

In a preferred embodiment, if the alarm event is an emergency, then as shown in FIG. 2, emergency dispatch is given notice to join the conference network. In a preferred embodiment, if an alarm event is not an emergency, the initial notice to join the conference network is provided to parties other than emergency dispatch operators. For example, notice could be first given to a friend or family member, or to a health care provider. Notice may be given concurrently or in sequence. In a preferred embodiment, alarm events that are associated with a low level of hazard or concern are associated with responses and contact persons that are appropriate for responding, rather than emergency dispatch or control center operators. For example, an alarm event indicating that a subscriber needs transportation may trigger the personal emergency response system to contact a friend or family member of the subscriber. In some embodiments, where the personal emergency response system gives notice to emergency dispatch or control center operators, requesting that they join the conference network, if other notified parties do not timely join the conference network.

In some embodiments, data transmitted from the subscriber device or from an auxiliary device is made available to one or more parties. Such data may be made available to all parties that are notified to join the conference network, or to a subset of such parties. For example, data may be provided only to emergency dispatch and not to other parties. In some embodiments, a password may be required to access data. In some embodiments, different subsets of data may be available to different parties. Data that may be made available may include GPS location, direction of travel and speed, and positional orientation of the subscriber device, as well as audio feeds, video feeds, environmental information, and sensory information from the subscriber device, such as fall-sensor data. Additionally, data made available may include auxiliary device information such as medical sensor information or home automation system information. Further, data made available may include data stored in the data warehouse 108, such as the subscriber's personal information and historical data associated with the subscriber device or the subscriber. Personal information may include vital life information, insurance information, preferred medical provider, physicians, hospital information and contact information.

In some embodiments, the subscriber device may be configured to provide instructions or alerts to a subscriber, including text, color, voice or audible sound, and combinations thereof. For example, the personal emergency response system may be configured to send instructions to a subscriber in response to an alarm event. Instructions may include navigation to a waypoint, or instructions for performing personal care procedures such a taking medication or self-treating a minor ailment. In some embodiments, instructions may be automatically sent to a subscriber device in response to an alarm event. This may be advantageous for alarm events of low concern, such as if a subscriber simply forgot how to perform a simple task.

In some embodiments, a subscriber device may be equipped with a fall detection sensor or device orientation sensor. The occurrence of a detected fall or the occurrence of a horizontal position of the device may trigger an alarm event. Different alarm events may be associated with different types of detected falls or with the duration that the sensor remains in the horizontal position. For example, if a fall appears severe, the alarm event may initiate the conference network directly with emergency dispatch. Conversely, if a fall appears minor, the personal emergency response system may send an automated response requesting that the subscriber confirm that he or she is okay, and initiate the conference network absent timely confirmation from the subscriber that he or she is okay. In some embodiments, an alarm event associated with a fall sensor may trigger the personal emergency response system to give notice to a heath care provider or a family member to join the conference network, and then initiate a conference network with emergency dispatch if the health care provider or family member do not timely respond.

In some embodiments, a subscriber may trigger an alarm event if the subscriber is lost. In response, navigation to a way-point may be provided on the subscriber device. The subscriber device may be prompted to provide navigation automatically upon the occurrence of an alarm event. For example, an alarm event associated with being lost may trigger navigation instructions to be automatically sent to the subscriber device. Additionally, a party to the conference network may prompt the personal emergency response system to provide navigation instructions upon learning during the conference that the subscriber is lost. In some embodiments, an alarm event may be triggered if a subscriber device is detected to be outside of a certain region. One response to such an alarm event may be an automatic prompt, requesting that the subscriber confirm that they are not lost or that they are okay. Confirmation may conclude the alarm event, or absent confirmation, subsequent responses may be triggered, such as initiating a conference network with one or more parties. In some embodiments, various navigation waypoints may be pre-programmed using the user interface 124.

In some embodiments, navigation instructions may be simplified and condensed, such as only including a simple directional arrow and distance to a waypoint. The directional arrow may indicate turns when needed and distance to the desired waypoint. Such simplified instructions may be advantageous where the subscriber may not have cognitive abilities or resources available to comprehend more complicated navigation instructions.

In some embodiments, a subscriber device may be associated with one or more auxiliary devices. Conditions related to an auxiliary device may trigger alarm events. An alarm event may be triggered if a healthcare device transmits a measurement that falls outside of a desired range. For example, if a heart rate monitor transmits an irregular heartbeat, an alarm event may be triggered, thereby enabling timely response without the need for the subscriber to manually summon for help. Similarly, an alarm event may be triggered if a home automation device indicates that something is amiss in the home. For example, if a subscriber is locked out of the home, the subscriber may trigger an alarm event to cause a home automation system to automatically unlock the door to allow the subscriber to gain access to the home without having to directly contact a friend, neighbor, or property manager. Additionally, in some embodiments parties responding to an alarm event may interact with auxiliary devices to better enable an appropriate response. For example, a responding party may view data transmitted from auxiliary devices to help diagnose the nature of a subscriber's condition. A responding party may also transmit instructions to an auxiliary device that are responsive to an alarm event.

In some embodiments, information associated with auxiliary devices may be transmitted to the personal emergency response system and stored in the data warehouse 108, thereby enabling authorized persons to access such information as needed. Such auxiliary device information may be displayable to parties upon the occurrence of an alarm event, or alternatively may be accessible on an ad-hoc basis. Access settings may be defined via a user interface for various parties.

In some embodiments, the personal emergency response system may be configured to provide reminders to a subscriber. The reminder may comprise a visual, audio, or tactile alert. Reminders may include medicine reminders, appointment reminders, meal time reminders, and reminders of other information that a subscriber may need to recall throughout the day. Reminders may be programmed into the personal emergency response system and associated with a subscriber device by the subscriber, or by friends, family members, health care providers, control center operators, or other parties through a user interface accessible via a web browser, smart phone application or other device. In some embodiments, the reminder schedules are stored on the subscriber device such that a connection between the subscriber device and the personal emergency response system is not necessary for the reminders to be prompted on the subscriber device.

In some embodiments, a subscriber may be prompted to acknowledge that a task has been performed. The task may be derived from a reminder schedule or from a third-party such as a health care provider, physician, or family member. In some embodiments, an alarm event may be triggered absent timely confirmation that the task has been performed.

Figure 3:
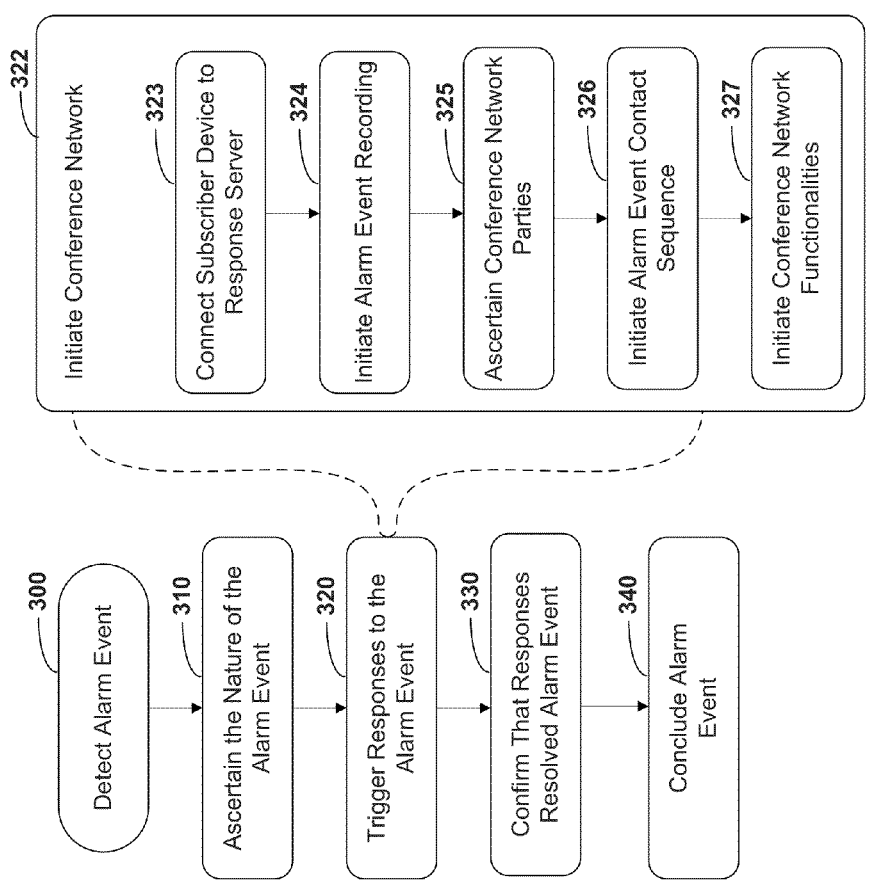
FIG. 3 shows a flow chart detailing one embodiment of a computer-implemented method for responding to a personal emergency response system alarm event.

FIG. 3 shows a flow chart detailing one embodiment of a computer-implemented method for responding to a personal emergency response system alarm event. Those skilled in the art will appreciate that numerous other embodiments of methods for responding to a personal emergency response system alarm event are within the spirit and scope of the disclosure herein.

As described in the embodiment shown in FIG. 3, upon having detected an alarm event 300, the personal emergency response system ascertains the nature of the alarm event 310, then triggers one or more response to the alarm event 320. The one or more responses may be triggered concurrently or in sequence, and may include, among other things, initiating a conference network, interacting with a subscriber device, interacting with an auxiliary device, or recording content associated with the alarm event. The embodiment described in FIG. 3 contemplates that the response to the alarm event is to initiate a conference network 322. As described in FIG. 3, the conference network may be initiated by connecting the subscriber device to the response server 323, and initiating alarm event recording 324. If the subscriber device is configured for continuous recording, the step of initiating alarm event recording 324 may be unnecessary. Next, the personal emergency response system ascertains the conference network parties 325, which are the parties to be given notice to join the conference network, and then the conference network contact sequence is initiated 326. Conference network functionalities are then initiated 327, which may comprise conference bridge commands, in-bound data commands, and out-bound data commands. Conference network functionalities may be accessible via a user interface. The interface may be a web-based interface or a telephone keypad interface such as a dual-tone multi-frequency signaling interface. After the conference network has been initiated, the embodiment described in FIG. 3 contemplates that the personal emergency response system then confirms that responses to the alarm event have resolved the alarm event 330, and if so, concludes the alarm event 340. In some embodiments, if the responses to the alarm event have not timely resolved the alarm event, the alarm event may be escalated, such as to emergency dispatch.

Figure 4:
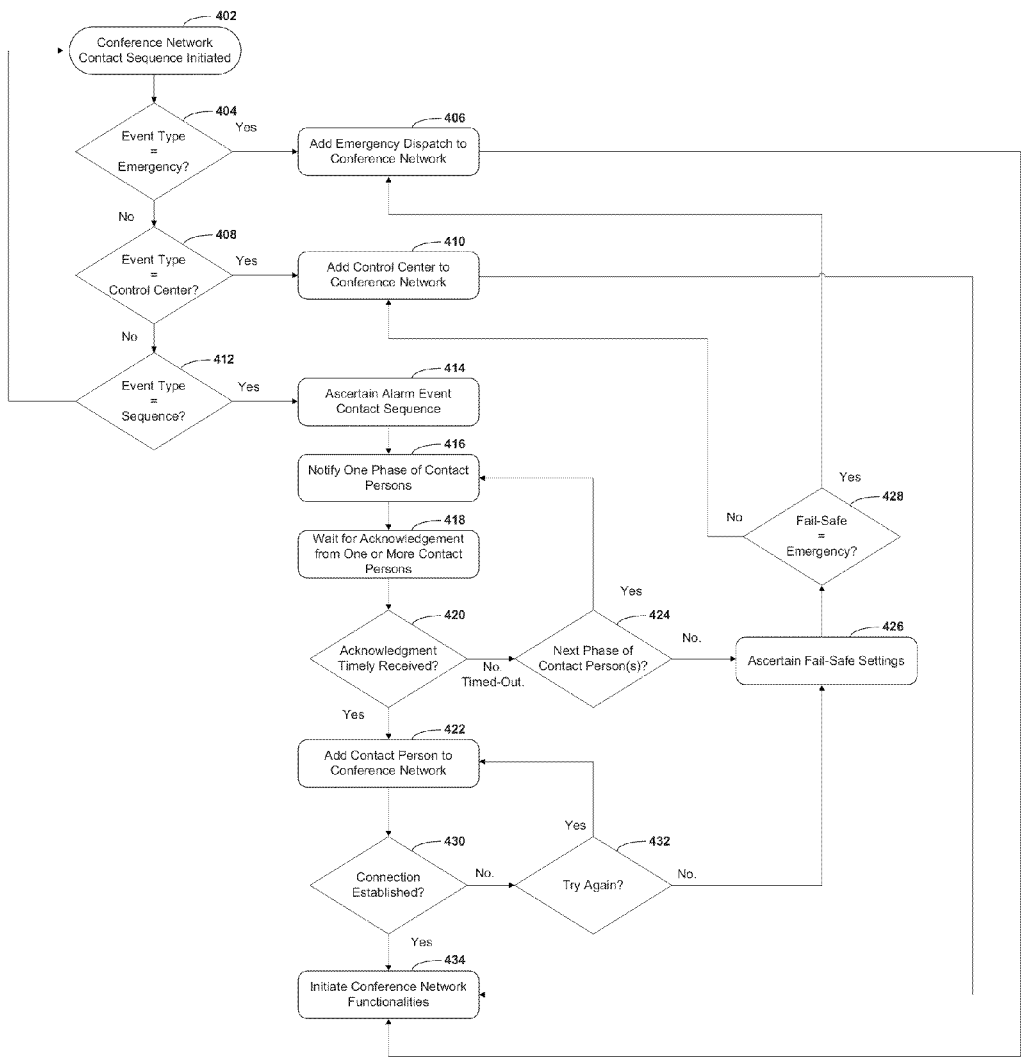
FIG. 4 shows a flow chart detailing one embodiment of a contact sequence for initiating a conference network.

FIG. 4 shows a flow chart detailing one embodiment of a contact sequence for initiating a conference network. As described in the embodiment shown in FIG. 4, upon the contact sequence having been initiated 402, if the alarm event type requires emergency dispatch 404, then emergency dispatch is added to the conference network 406. If the alarm event type requires a control center operator 408, then the control center is added to the conference network 410. If the alarm event type requires a contact sequence of one or more parties 412, then the personal emergency response system ascertains the alarm event contact sequence 414. Next, the personal emergency response system gives notice to one phase of contact persons 416, and then waits for acknowledgment from one or more contact persons 418. If acknowledgment is timely received 420, the one or more contact persons are added to the conference network 422. If acknowledgment is not timely received 420, then the personal emergency response system determines if there exists a next subsequent phase of contact persons 424, and if so, notifies such contact persons 418. This loop is repeated until one or more contact persons are added to the conference network 422, or all subsequent phases of contact persons have been exhausted.

If there are no subsequent phases of contact persons remaining to be contacted 424, then the personal emergency response system ascertains what fail-safe settings are in place 426. If the fail-safe settings provide for escalating the alarm event to emergency dispatch 428, then emergency dispatch is added to the conference network 406. Otherwise, the control center is added to the conference network 410.

When adding a party to the conference network, the personal emergency response system ascertains whether a connection has been established between the subscriber device and the party being added 430, and if so, access to the conference network functionalities is made available to such party or parties 432. If a connection between the subscriber device and the party being added has not been established, the personal emergency response system ascertains whether to attempt again to establish a connection 434, and if so, repeats the process of adding the party to the conference network 422. Otherwise, the personal emergency response system ascertains what fail-safe settings are in place 426 and proceeds appropriately.

Figure 5:
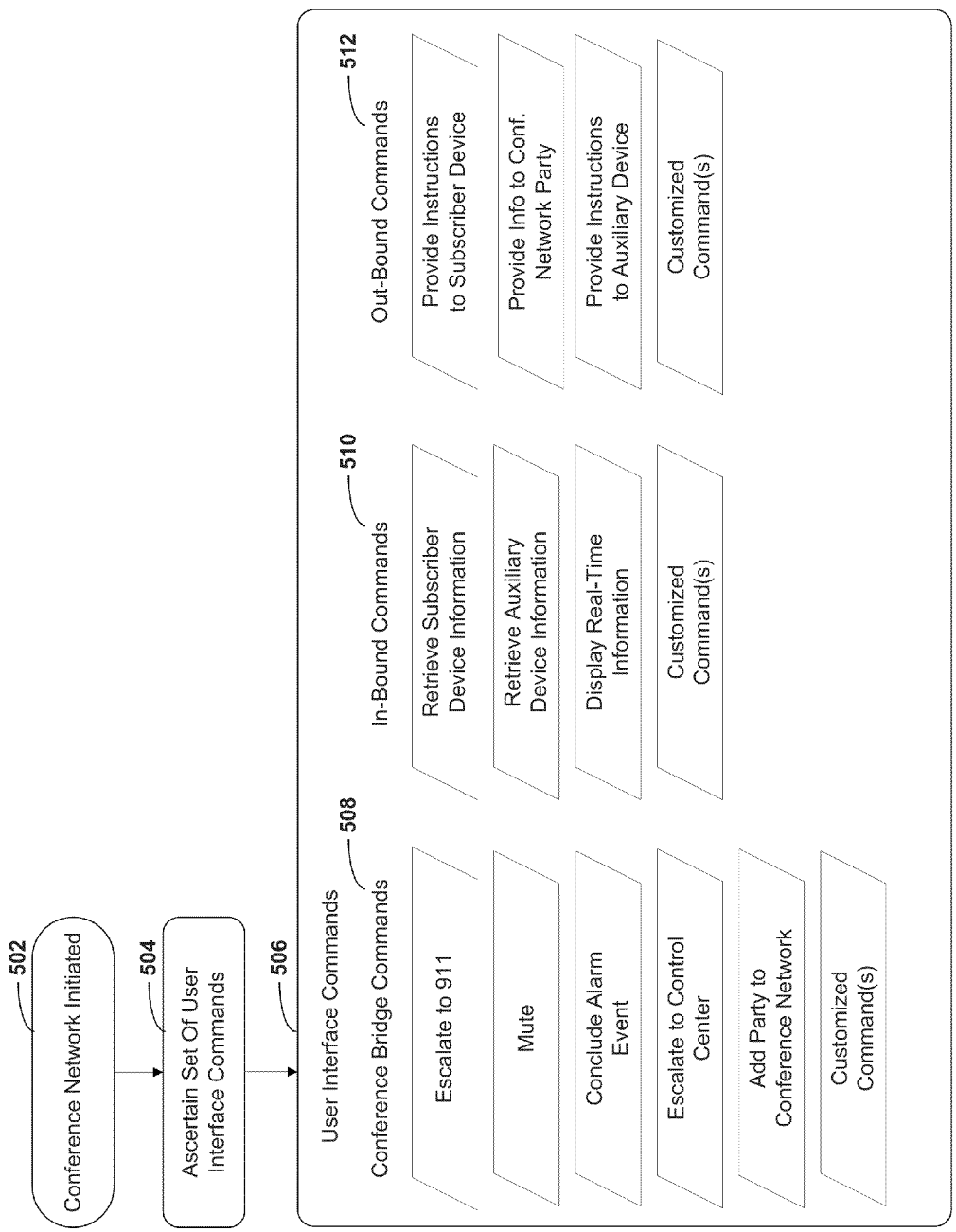
FIG. 5 shows a block diagram depicting one embodiment of user interface commands availed to users of one embodiment of a personal emergency response system.

FIG. 5 shows a block diagram depicting one embodiment of user interface commands availed to users of one embodiment of a personal emergency response system. Those skilled in the art will appreciate that numerous other embodiments of user interface commands and associated user interfaces are within the spirit and scope of the disclosure herein. FIG. 5 depicts a set of user interface commands that are made available to parties to a conference network. Upon the conference network having been initiated 502, the personal emergency response system ascertains the set of user interface commands to be made available to parties to the conference network 504, and then the appropriate set of user interface commands is made available to the parties to the conference network 506. In the embodiment described in FIG. 5, the user interface commands comprise conference bridge commands 508, in-bound commands 510, and out-bound commands 512. The conference bridge commands 508 include escalating to emergency dispatch, mute, conclude alarm event, escalate to control center, add party to conference network, and may also include one or more customized commands. The in-bound commands 510 include retrieve subscriber device information, retrieve auxiliary device information, display real-time information, and may also include one or more customized commands. The out-bound commands 512 include provide instructions to subscriber device, provide info to a conference network party, provide instructions to an auxiliary device, and may also include one or more customized commands.

Figure 6:
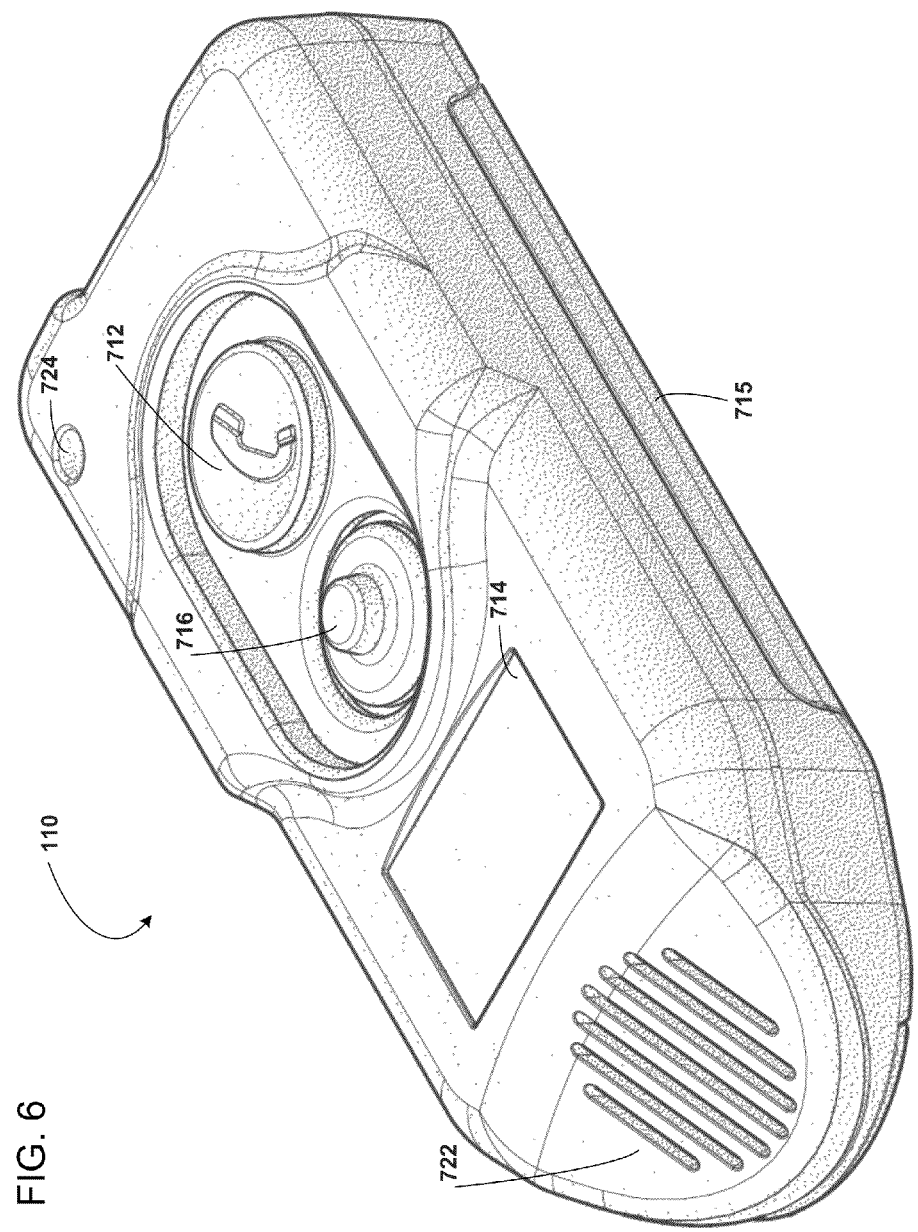
FIG. 6 shows an isometric view of an exemplary subscriber device.

FIG. 6 shows an isometric view of an exemplary subscriber device 110. The subscriber device is configured to interact with the personal emergency response system 100, for example. The subscriber device may alternatively or in addition to interact with other emergency response systems, for example, systems monitored by a central control center; systems requiring a subscription; systems operating without a subscription; systems monitored by a central monitoring station; systems enabling connections to family members, neighbors, or local emergency responders; and/or systems comprising a PSAP (public safety answering point) or more than one PSAPs. The subscriber device may, in some embodiments, be alternatively or in addition to the subscriber device described herein one or more of a fall alert button or an MPERS (mobile personal emergency response system). In different embodiments the subscriber device may be one or more of a personal mobile communications device, a mobile cellular device, a mobile PCS device, or other mobile transmitter.

In an embodiment, a housing of the subscriber device 110 includes an aperture through which a lanyard may be threaded such that the subscriber device may be worn around the neck of the user as a pendant. In a different embodiment, the subscriber device may be configured such that it may be worn as a wristband. In other embodiments, the subscriber device may be a thin device which may be kept in a pants pocket, shirt pocket, or jacket pocket, or clipped to a belt, or stored in a purse.

In an embodiment, the subscriber device 110 includes an alert button 712; one or more displays, such as display 714; a joystick/select button 716; one or more speakers, such as the speaker 722; and/or one or more microphones, such as the microphone 724. The alert button may be a portion of a user interface module of the subscriber device, the alert button being configured to respond to a press of the alert button by initiating one or more transmissions to an automated personal emergency response system, such as but not limited to the personal emergency response system 100 described elsewhere herein. The alert button may be configured to respond to a press of the alert button by initiating one or more cellular transmissions to a single telephone number associated with the automated personal response system so as to, for example, begin two-way communications and/or data transmissions among one or more parties and the subscriber device via the one or more cellular transmissions. In different embodiments, the user interface may have other, additional buttons with different buttons configured to trigger different alarm events. The subscriber device may also include an on/off button. The subscriber device could also include individual buttons for auto-dialing particular telephone numbers. For example, a first button of the subscriber device could be enabled for auto-dialing an emergency number such as 911, while a second button could be enabled for auto-dialing medical personnel such as a doctor or nurse of the user, and a third button could be enabled for auto-dialing a family member or other caretaker. However, in some embodiments a plurality of buttons may be undesirable and/or confusing to a user such that the optimum deployment of buttons is limited to an alert button and/or a joystick/select button.

Figure 9:
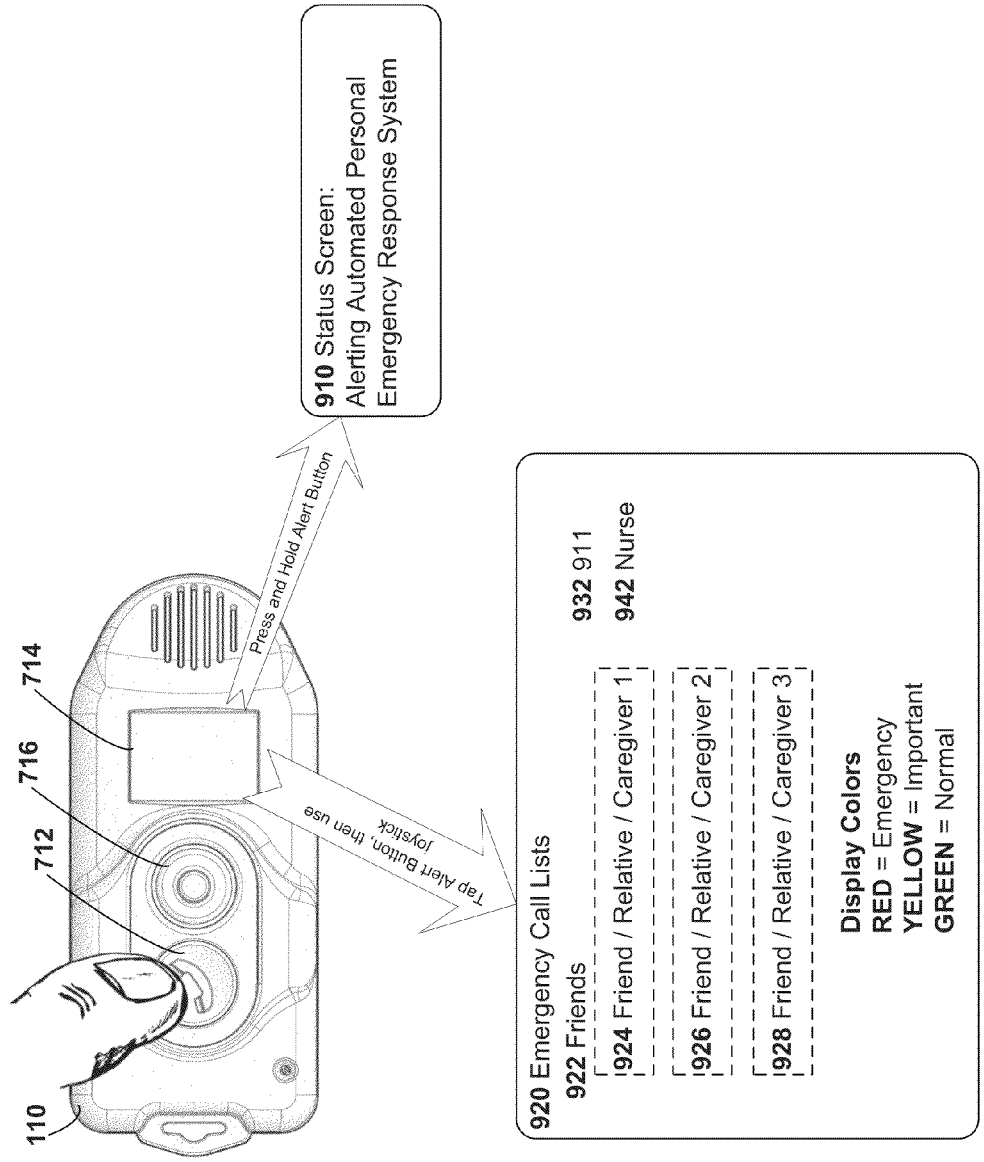
FIG. 9 shows a block diagram depicting a different embodiment of user interface commands availed to users of the exemplary subscriber device.

In some embodiments of the subscriber device 110, one or more displays, such as display 714, comprise a portion of the user interface module. The display may be a color display and may additionally be an OLED display. The color display provides a range of functionality in a variety of operational modes of the subscriber device. In a non-limiting example of an operating mode of the subscriber device, the color display may present a menu structure to a user of the subscriber device. In a different operating mode of the subscriber device, the color display may be used strictly to display large arrows which utilize the entire display to provide highly-visible directional and/or navigational guidance to a user of the subscriber device. The color display could alternatively display an arrow and a distance in the navigational guidance mode, the distance being to the next turn or to the destination. The colors of the display could be organized to relate to an urgency status of the various messages. For example, as shown in FIG. 9, "Emergency" messages could be displayed in red, while "Important" messages could be shown in yellow and messages with a "Normal" urgency could be shown in Green. Different display fonts and sizes for text prompts and status messages may also be facilitated via the display. The display may be configured to enable tactile or touch-screen interactions with various menu options. The vibrator motor 790 may be engaged to provide tactile interaction upon a virtual button of the display being pressed. Video conferencing may also be enabled via the display.

In some embodiments of the subscriber device 110, one or more controls, such as the joystick/select button 716, are present. The joystick may provide a replacement for four arrow keys of a keyboard and enable a user to navigate a menu structure by pressing the joystick in each of four ordinal directions to provide selection input of up, down, left and right. The joystick may also be depressed downward (i.e. towards the center of the unit rather than to one of the sides) to provide a select functionality.

In particular embodiments, the alert button 712 and the joystick/select button 716 are provided with a rubber gasket on the outside of the alert button and joystick/select button, the rubber gasket in communication with the housing of the subscriber device 110 to ensure water, moisture or foreign objects do not enter the subscriber device and ensuring the subscriber device retains a water-resistant character.

The subscriber device 110 may also include one or more speakers, such as the speaker 722. Speakers may be included in the user interface module or the audio module of the subscriber device. A speaker in the subscriber device may have a volume that is user configurable, such as by a menu presented to the user of the subscriber device on the display 714 in which the menu options are chosen via the joystick/select button 716. In some embodiments, the speaker volume may have a volume of at least 100 decibels ensuring that audio originating from a speaker of the subscriber device may be adequately heard by a user of the subscriber device. Particularly, the speaker volume may be set remotely, for example, by a party to a two-way communication including the subscriber device. For example, during a two-way communication initiated by the user pressing the alert button 112 (or initiated in some other manner, such as by a remote user), a party included in the two-way communication (such as a teleconference) may use a star command to set the volume on the subscriber device, overriding a volume setting which has been set by the user of the subscriber device (i.e. a party joined telephonically may press DTMF keys on the telephone, for example "*8", to control and/or maximize the volume of speaker output of the subscriber device, overriding any lower volume setting performed by the user). In certain embodiments, the subscriber device may include a plurality of speakers.

The subscriber device 110 may also include one or more microphones, such as the microphone 724. Microphones may be included in the user interface module or the audio module of the subscriber device. A microphone in the subscriber device may facilitate user interaction with the device and/or transmit the speech of the user to the two-way communications initiated in response to the alert button press. Further, the subscriber device may be configured so that, in an alternative to the user pressing the alert button, the user may voice a command to the subscriber device. For example, the subscriber device may be further enabled with voice recognition (in the audio module, e.g.) whereby the user may shout "Help!" which, when detected by the subscriber device via a microphone of the subscriber device, causes the subscriber device to initiate the one or more transmissions to the automated personal emergency response system. In different modes, the plurality of speakers and/or plurality of microphones may be combined with digital signal processing techniques to, for example, assist with shaping the audio stream and/or detection of speech by the user which might include performing noise reduction, removing background noise, detecting ambient noise, or performing other functions which may better be realized via a plurality of microphones and/or speakers in the subscriber device. This could even include estimating a distance and direction of the user of the subscriber device from the subscriber device itself, which information could be transmitted via the two-way communications and enable parties to the teleconference and/or emergency responders to know the location of the user relative to the subscriber device.

At least one speaker 722 and at least one microphone 724 of the subscriber device 110 are configured to facilitate communications between a user of the subscriber device and at least some parties joined to a teleconference established by the automated personal emergency response system in response to a press of the alert button 712 on the subscriber device. Upon a user of the subscriber device (or other individual) pressing and holding the alert button of the subscriber device, two-way communications (which may include a teleconference established by a cloud-based conference bridge of the personal emergency response system) may be established with the subscriber device and its user(s) comprising one "party" to the teleconference and other parties being joined to the conference via operations described elsewhere within this application. The subscriber device thus operates as a speakerphone in which the speaker and the microphone are engaged to facilitate aural communication between the user(s) of the subscriber device and other parties to the two-way communication. Using one or more display(s) 714 for the two-way communication transforms the speakerphone to a videoconference terminal. One or more image sensors may be provided in the subscriber device, the image sensor(s) providing an image capture capability so that images of the user of the subscriber device may be provided to the videoconference.

Also depicted in FIG. 6 is that the subscriber device 110 may have an access door 715. Opening the access door may reveal a compartment for a battery or other portable power supply for the subscriber device. The subscriber device may be provided with two batteries and an external battery charger. In this manner, a first battery may be powering the subscriber device while a second battery is charging. A caretaker or other person may change the batteries for the user of the subscriber device by opening the access door, removing a first, at-least-partially-depleted battery and replacing the first battery with a second, more fully charged battery. A bridge battery may keep volatile storage within the subscriber device energized during the battery replacement (i.e. first-to-second main battery replacement) process, such that a reboot process of the subscriber device is not necessitated by swapping batteries. A USB port 740 (not visible in FIG. 6) may be behind the access door, or be otherwise accessible on the housing of the subscriber device. The USB port may include charging of an internal battery of the subscriber device and/or could facilitate programming/configuration of the subscriber device. The USB port may, for example, be used in lieu of or in addition to the web dashboard to facilitate all programming and/or reporting of the subscriber device which is available via the web dashboard.

Figure 7:
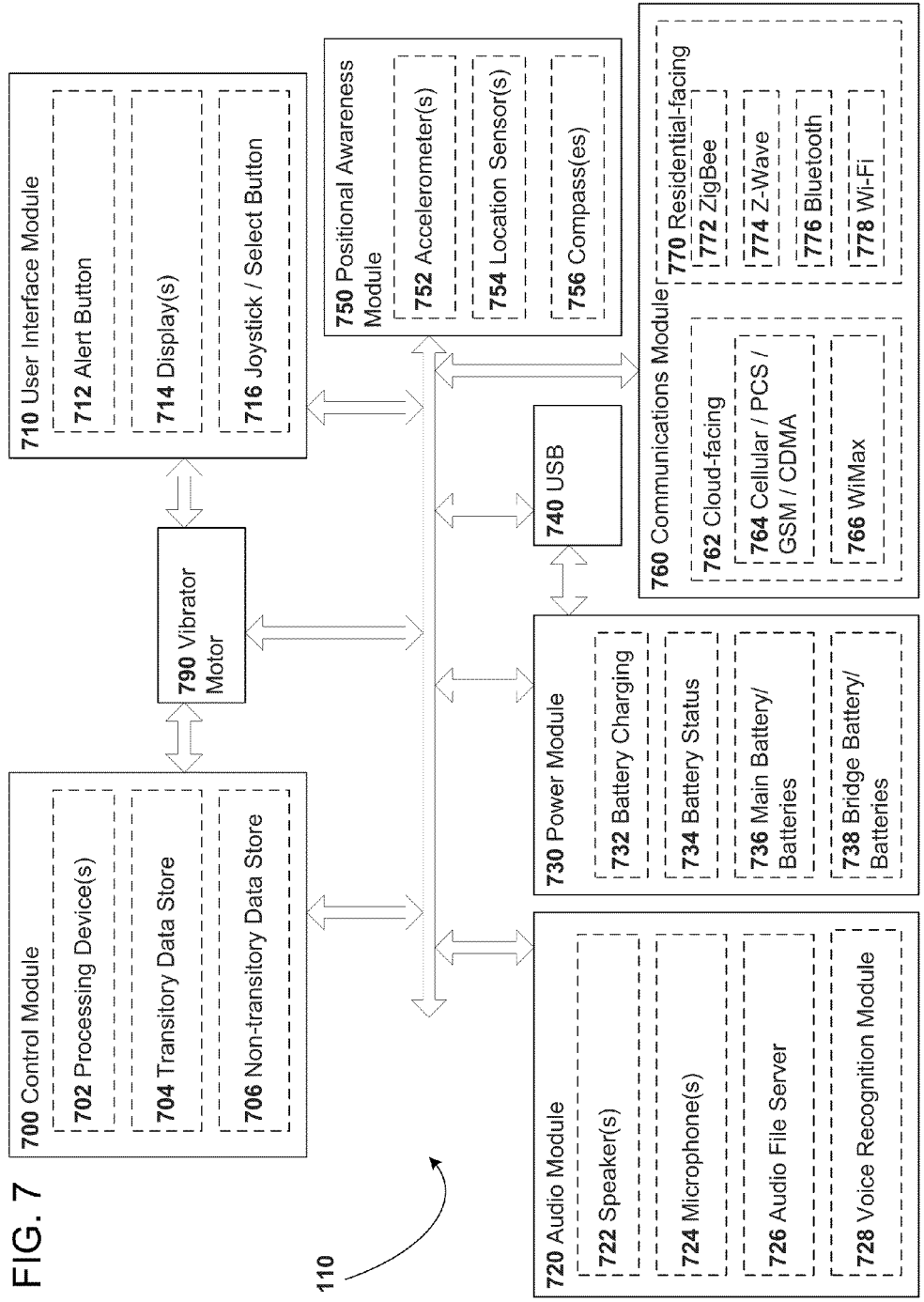
FIG. 7 shows a block diagram detailing circuitry and/or hardware aspects of an exemplary subscriber device.

FIG. 7 shows a block diagram detailing circuitry and/or hardware aspects of an exemplary subscriber device 110. In some embodiments, a subscriber device comprises an article of manufacture including at least a user interface module 710; a communications module 760; an audio module 720; a positional awareness module 750; a control module 700; and a power module 730. The foregoing modules may communicate with one another via a system bus of the subscriber device. Other aspects of the subscriber device may include a vibrator motor 790 and one or more USB connections 740. The vibrator motor may in some embodiments be coupled with the user interface module; the USB connections may be partially resident, interface with and/or in communication with one of the other modules. For example, USB interfaces may be present within a battery cavity exposed by the access door 715 and/or be accessible via the housing of the subscriber device.

Control module 700 may include one or more processing devices 702, such as, for example, a microprocessor. A transitory data store 704 may be present, including a memory which may be RAM, SRAM, EDO-RAM, or any other type of random access memory. A non-transitory data store 706 may be present, including ROM, Flash EPROM, a solid state hard disk, a magnetic rotating hard disk, or any other type of storage which retains its configuration when power is not applied to the storage. The non-transitory data store may include one or more instructions encoded as operations that may be performed by the subscriber device and/or configuration information for the subscriber device. As described elsewhere herein, such configuration information may be entered via a web dashboard and transmitted to the subscriber device, including telephone numbers to be dialed, information particular to the user of the subscriber device, etc.

The user interface module 710 may include an alert button 712, one or more displays 714, and/or a joystick/select button 716. Other elements of the subscriber device 110 may optionally be implemented as a portion of the user interface module. In some embodiments, audio functionality may be included in the user interface module; alternatively, it may also be resident in audio module 720. Other user interface aspects may also be present, such as additional buttons for on/off or additional one-touch auto-dialer buttons. In certain embodiments, the user interface may be limited to only the alert button and the joystick/select button to reduce the number of buttons on the device and make the device operation less confusing for users of the subscriber device. Operation of the foregoing aspects of the user interface module has been described elsewhere herein with relation to FIG. 6 inter alia.

The audio module 720 may include one or more speakers 722, one or more microphones 724, an audio file server 726, and/or a voice recognition module 728. Operation of the one or more speakers, the one or more microphones, and the voice recognition module of the audio module has been described elsewhere herein with relation to FIG. 6 inter alia. An audio file server is present to present aural prompts to the user of the subscriber device 110. For example, the subscriber device may speak the words "Dialing" or "Time to take your medication" or "Out of network service area". Storing these voice prompts on the subscriber device, perhaps using the non-transitory data store 706, and serving them using the audio file server is advantageous over merely blinking a light indicating a code. Additionally, the audio file server ensures aural prompts may be given by the subscriber device even should the subscriber device be out of wireless range.

The power module 730 may include battery charging logic 732, battery status logic 734, one or more main batteries 736 and one or more bridge batteries 738. In some embodiments, the subscriber device 110 may be powered by one or more main batteries which are removable from the unit via the access door 715. Batteries may be charged in some embodiments while in the unit, perhaps via USB port 740. However, it is anticipated that the subscriber device will be on the person of the user at all times, and that requiring the subscriber device to be coupled with a wall charger would be impractical in some situations as it would either require the user to be adjacent to the wall charger during charging, or require the user to divest the device during a charging period. Therefore, even though battery charging logic may be present in the unit, it is envisioned that this would receive secondary use, e.g. during initial charging prior to giving the unit to the user or in other similar situations. Battery status logic is present in order for the subscriber device to be able to report a current state of the battery (i.e. how much of the battery life has drained and how much remains). Reporting of the current battery state may be provided on the status/info screen 830, via the two-way communications, or to the web dashboard perhaps using the "Retrieve Subscriber Device Information" portion of the in-bound commands 510 described with relation to FIG. 5 inter alia. Operation of the one or more bridge batteries of the power module has been described elsewhere herein with relation to FIG. 6 inter alia.

The positional awareness module 750 may include one or more accelerometers 752, one or more location sensors 754, and/or one or more compasses 756. Accelerometers in the subscriber device 110 may aid in fall detection or may be used to determine orientation of the device. Importantly, the accelerometer(s) differentiate between a fall and the device (when provided as a pendant) merely swinging normally around the user's neck when the user walks while wearing the pendant. Detecting a fall of the user of the subscriber device may include detecting a severity of the fall, generating information which may be used by the device to determine a particular alarm event as described elsewhere herein. The accelerometer(s) may also be used to determine an orientation of the device which, in conjunction with a measurement of the amount of time the device is in a particular orientation, may be used to determine a different alarm event. For example, if the accelerometer detects a sudden fall with the device remaining in a horizontal position for a long period of time, the device may request confirmation from the user that the user is okay via the user interface module, and if the device does not receive such confirmation it will automatically initiate the two-way communications with the personal emergency response system. In some embodiments, the fall sensors may be disabled for a period or permanently, as some users may want only the home automation, medical telematics, and/or user-initiated emergency response features without the fall sensor being able to initiate an emergency call automatically. The one or more location sensors may include GPS, GLONASS, triangulation with cellular towers or any other means of sensing a location of the subscriber device. Location may be used to provide navigation or guidance to the user of the subscriber device. For example, a user may use the user interface to choose "Home" as a desired destination, and the location sensors may be used to determine a current location and provide, perhaps in conjunction with navigation logic and/or one or more accelerometers of the device, directions including a large arrow on the display. One or more compasses of the device may be used to assist in navigational guidance, display headings to the user or utilize the headings for guidance in addition to or instead of the accelerometers/location sensors. Alternatively, the location sensors may be used in a situation in which the user of the subscriber device is lost or disoriented and cannot be located. Using the web dashboard, a caretaker can get the current location of the subscriber device and dispatch aid to that location. Or, in a situation where the user initiates an emergency two-way communication via pressing the alert button (or where the device independently determines an emergency exists and initiates the two-way communication), the current location detected by location sensors of the subscriber device may be transmitted to other parties on the communication so that emergency responders can be sent to the exact location. A destination may be provided via the web dashboard, so that an operator at the web dashboard can assist the user with a return to a particular destination.

The communications module 760 may include a plurality of wireless communications connections having varying ranges and functionality. Generally, the wireless connections may be divided into cloud-facing 762 (i.e. long range) and residential-facing 770 (i.e. short range). However, the descriptions "cloud-facing", "residential-facing", "short range", and "long range" are intended as non-limiting descriptions only, and should not be construed to mean that a particular connection may only be used to establish communications with a destination at a particular distance. For example, while the subscriber device 110 may be equipped with both a Wi-Fi and a cellular connection, either may be used for any type of communication within a residence irrespective of any designation herein of "cloud-facing" or "residential facing". An operator at the web dashboard may connect to the subscriber device in a user's home via either the cellular connection or via Wi-Fi using a Wi-Fi router in the user's home. A plurality of antennas is included in the subscriber device to support the various wireless connections as appropriate.

In some embodiments, the cloud-facing connections 762 may include a cellular connection 764, including at least one of PCS, GSM or CDMA. The subscriber device 110 may include circuitry which enables the device to transmit and receive on either (i.e. toggle between) GSM or CDMA, the selection being a configuration choice which may be made at the subscriber device or via the web dashboard. The subscriber device may also utilize circuitry which is limited to a particular number of pre-programmed numbers in hardware for cellular connections. This may be advantageous for reasons of cost control of production of the subscriber device. For example, the subscriber device may utilize a cellular chip (e.g. a cellular telephone chipset from Qualcomm, Gemalto or other provider) which is capable of dialing any telephone number. However, by hardware-limiting the quantity of telephone numbers which may be stored simultaneously, the license fee for the cellular chip may be lowered. Accordingly, the subscriber device may be provisioned with circuitry that limits the quantity of numbers which may be stored and auto-dialed to three to leverage the lower license fee from the provider of the cellular chip. (For the purposes of the patent claims of this patent application and any related patent application, the foregoing expressly represents a "negative limitation" which may be a portion of a patent claim presented either with the application as filed or in a claim amendment.) Once a two-way communication with the personal emergency response system is established, additional parties may then be added telephonically, enabling contact with more than three numbers via the conference bridge but still enabling the lower cost license for the subscriber device to be leveraged. In addition to or alternatively, the cloud-facing portion of the subscriber device may include a WiMax connection 766. Other cloud-facing connections are envisioned for the subscriber device including HSPA+, LTE, Flash-OFDM, iBurst, EDGE (and EDGE Evolution), UMTS, EV-DO, and others.

In some embodiments, the residential-facing connections 770 may include connections for ZigBee 772, Z-Wave 774, Bluetooth 776 and/or Wi-Fi 778. Other residential-facing connections are envisioned for the subscriber device including near field communication (NFC), RFID, and others. Some or all of the residential-facing connections provide data communications with medical telematics devices in the home. For example, machines which detect vital signs of the user of the subscriber device 110 and/or environmental factors within the home can be in communication with the subscriber device so that such data may be transmitted via the two-way communications with the personal emergency response system and/or to the web dashboard. Such medical devices may include, but are not limited to, heart rate monitors, waveform monitors, blood glucose monitors, oximeters, dosimeters, pacemakers, etc. Additionally, some or all of the residential-facing connections provide data communications with home automation devices in the home, including, but not limited to, alarm systems, automatic door locks, automatic outlets, and climate control systems and devices. The subscriber device can, independently or upon receiving a command from the web dashboard or the personal emergency response system, turn on a light or unlock a door. This may be advantageous in a scenario where the user of the subscriber device has unexpectedly fallen. The subscriber device may automatically and independently initiate a contact with the personal emergency response system. When public safety responders come to the home, the front door may be unlocked automatically via a home automation device receiving a command sent by the subscriber device via a residential-facing connection. For example, a Schlage or Kwikset front door lock with a Z-Wave connection installed at the front door may be sent an instruction by the subscriber device to unlock the front door so that emergency responders may enter the home even though the user is incapacitated. The subscriber device may be configured (perhaps via the web dashboard) to automatically unlock the front door via the Z-Wave connection any time it automatically initiates an alert to the personal emergency response system. Alternatively, a party to the teleconference initiated by the subscriber device may use a star command (e.g. "*7" to unlock the door) to enable access to the home and the user by EMS technicians dispatched to render aid to the user of the subscriber device.

Figure 8:
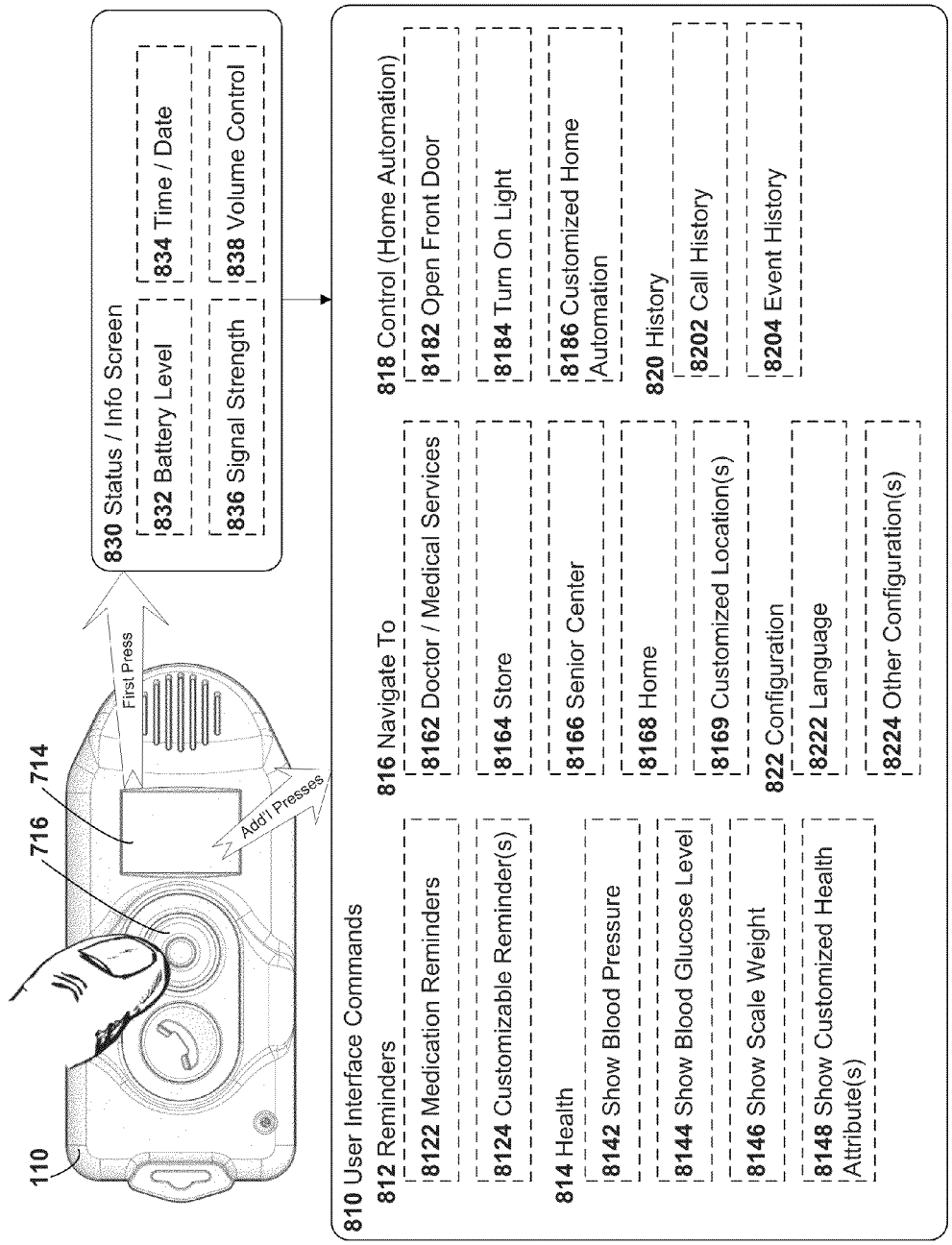
FIG. 8 shows a block diagram depicting one embodiment of user interface commands availed to users of the exemplary subscriber device.

FIG. 8 shows a block diagram depicting one embodiment of user interface commands availed to users of the exemplary subscriber device 110. Upon the user pressing the joystick/status button 716, a status/info screen 830 will be displayed on the display 714. The status/info screen may provide such information as a battery level 832, a current time and/or date 834, one or more signal strengths 836 relating to some or all of the wireless connections of the subscriber device, and/or a volume control 838. By manipulating the four-way joystick, the user may navigate through various operations of the subscriber device via a menu 810 of the user interface. The subscriber device may be configured to provide reminders 812 of particular events, for example, medication reminders 8122 at particular times or other customizable reminders 8124. Reminders may be programmed either via the subscriber device itself or via the web dashboard. At a prescribed reminder time, the user may be alerted via a visual signal on the color display, a tactile alert (i.e. the vibrator motor 790 shakes the device to get the attention of the user), and/or an aural signal (i.e. the subscriber device will intone "Time to take your medicine" via the audio file server). Importantly, the reminder schedule is stored within the non-transitory data store 706 of the subscriber device and reminders will continue to be given even if the subscriber device is out of range of any cloud-facing wireless connections. Reminders may be configured so that acknowledgements by the user are required (i.e. upon being alerted to take medicine, the user is required to acknowledge taking the medicine). The acknowledgement may be communicated to the web dashboard, stored in the data warehouse, or otherwise acted upon. Alternatively, or in addition to the foregoing, lack of an acknowledgement may generate an alert. Other reminders may be reminders regarding meals and/or appointments, among others.

The subscriber device 110 may be configured to display various health-related metrics 814 in response to selection via the menu 810 of the user interface and manipulation by the user of the four-way joystick 716. For example, the device may be commanded to "Show Blood Pressure" at 8142, "Show Blood Glucose Level" at 8144, "Show Scale Weight" at 8146, and/or show other customized health attributes(s) at 8148. Upon the user commanding the device to show one of the foregoing health-related metrics, the device may use a residential-facing connection described above to interrogate a particular medical telematics device. For example, upon being commanded to "Show Scale Weight", the device may communicate with a FitBit scale equipped with Wi-Fi to receive a recent weight measurement when the user last stepped on the scale. Current blood glucose readings may be sensed from a wearable biosensor, e.g. the Symphony tCGM wireless blood glucose monitor. Blood pressure may be sensed from wireless-equipped measuring systems from Welch Allyn, for example. A heart rate may be displayed via the subscriber device wirelessly connecting with a heart rate monitor (HRM) worn by the user, the HRM in wireless communication with the subscriber device using Bluetooth, 5 kHz or other type of connection. Any other types of medical and/or health metrics may be sensed via wireless connections in the subscriber device and displayed via the user interface. These measurements may also be transmitted to the personal emergency response system, stored in the data warehouse, and/or provided to the web dashboard, all in accordance with disclosures elsewhere herein.

The subscriber device 110 may be configured to display navigation and/or directional guidance information 816 in response to selection via the menu 810 of the user interface and manipulation by the user of the four-way joystick 716. For example, the device may be commanded to provide navigation and/or directional guidance to a "Doctor/Medical Services" at 8162, a "Store" at 8164, a "Senior Center" at 8166, the user's "Home" at 8168 and/or provide navigation and/or directional guidance to other customized destination(s) at 8169. Navigation and/or directional guidance information may then be presented to the user with the user interface module 710 and/or the positional awareness module 750 and including techniques and/or operations disclosed elsewhere herein in relation to FIG. 7 inter alia.

The subscriber device 110 may be configured to control home automation devices 818 and/or perform various home automation tasks in response to selection via the menu 810 of the user interface and manipulation by the user of the four-way joystick 716. For example, the device may be commanded to "Open Front Door" at 8182, "Turn On Light" at 8184, and/or perform other customized home automation tasks at 8186. Home automation tasks may be performed and home automation devices may be controlled with the user interface module 710 and/or the communications module 760 and including techniques and/or operations disclosed elsewhere herein in relation to FIG. 7 inter alia.

The subscriber device 110 may be configured to interact with a history 820 of the 970 device in response to selection via the menu 810 of the user interface and manipulation by the user of the four-way joystick 716. For example, the device may be commanded to show "Call History" at 8202, or to show "Event History" at 8204. Other commands related to the history may be performed via the user interface, including saving the history, uploading it to the data warehouse, and or perform other history-related tasks disclosed elsewhere herein.

The subscriber device 110 may be configured to perform configuration 822 of the device in response to selection via the menu 810 of the user interface and manipulation by the user of the four-way joystick 716. For example, a language setting 8222 for the device may be chosen. Other configuration options 8224 as appropriate for the subscriber device may also be chosen via the configuration menu. Configuration options may also be set via the web dashboard.

FIG. 9 shows a block diagram depicting a different embodiment of user interface commands availed to users of the exemplary subscriber device 110.

In an embodiment, upon the user pressing and holding the alert button 712, the subscriber device 110 will initiate one or more cellular transmissions to the personal emergency response system, in order for a teleconference to be established including two-way communications between parties to the teleconference and the subscriber device (and its user) using methods, hardware and/or operations disclosed elsewhere herein. A status screen 910 may be shown on the display 714 upon the alert button being held down, the status screen informing the user that the subscriber device is "Alerting Automated Personal Emergency Response System", or another suitable status message.

Upon the user pressing and releasing the alert button 712, an "Emergency Call List" screen 920 will be displayed on the display 714. In some embodiments, the number of pre-programmed telephone numbers for a phone call from the subscriber device 110 may be limited to no more than three, as discussed elsewhere herein. In different embodiments, a menu may be presented to the user for automatically dialing particular phone numbers. For example, the menu may include an option for "Friends" at 922, "911" at 932, and/or a "Nurse" at 942. The Friends menu may have options including "Friend/Relative/Caregiver 1" at 924, "Friend/Relative/Caregiver 2" at 926, and "Friend/Relative/Caregiver 3" at 928. The foregoing menu options may be selected using the joystick/select button 716. As discussed in relation to FIG. 6, the display may show messages and/or prompts in different colors (including perhaps red, yellow or green) to relate different levels of urgency to the messages or prompts.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

While various aspects and embodiments have been disclosed herein, other aspects and embodiments will be apparent to those skilled in the art. The various aspects and embodiments disclosed herein are for purposes of illustration and are not intended to be limiting. It is intended that the scope of this disclosure be defined by the following claims and their equivalents.

What is claimed is:

1. A subscriber device for alerting an automated personal emergency response system, comprising:
    a control module including at least one processing device;
    a user interface module operatively coupled to the control module, the user interface module including at least:
        an alert button configured to respond to an alert button press by initiating one or more transmissions to the automated personal emergency response system; and
        a visual display screen capable of rendering text in at least three colors; and
    an audio module operatively coupled to the control module, the audio module including at least:
        an audio file server, the audio file server configured to provide one or more audio voice prompts to a user of the subscriber device without the subscriber device being operatively connected to an external network;
        one or more speakers; and
        one or more microphones,
        wherein at least one speaker and at least one microphone are configured to facilitate communications between a user of the subscriber device and at least some parties joined to a teleconference established by the automated personal emergency response system in response to an alert button press, and wherein the audio module is capable of overriding a user volume setting of the subscriber device in response to a signal received by the subscriber device via an external network.

2. The subscriber device of claim 1, wherein the audio module operatively coupled to the control module comprises:
the audio module operatively coupled to the control module including at least a voice recognition module, the voice recognition module configured to detect one or more voice commands of a user of the subscriber device and initiate one or more transmissions to the automated personal emergency response system in response to at least one voice command of the user of the subscriber device.

3. The subscriber device of claim 1, further comprising:
a power module operatively coupled to the control module, wherein at least some data associated with the power module is associated with one or more signals to the automated personal emergency response system.

4. The subscriber device of claim 1, further comprising:
a positional awareness module operatively coupled to the control module, the positional awareness module including at least:
one or more accelerometers; and
one or more location sensors,
wherein at least some data gathered by at least one accelerometer or at least one location sensor is associated with one or more signals to the automated personal emergency response system.

5. The subscriber device of claim 4, wherein the positional awareness module operatively coupled to the control module comprises:
the positional awareness module configured to provide at least some directions or navigation to a user of the subscriber device in response to one or more transmissions associated with a teleconference established by the automated personal emergency response system in response to an alert button press.

6. The subscriber device of claim 1, further comprising:
a communications module operatively coupled to the control module, the communications module including at least a cellular module, the cellular module configured to facilitate communications between a user of the subscriber device and at least some parties joined to a teleconference established by the automated personal emergency response system in response to an alert button press.

7. The subscriber device of claim 6, wherein the cellular module comprises:
a cellular module configured to dial at least two but no more than three pre-programmed telephone numbers, said configuration established via a hardware limit on the quantity of telephone numbers which may be stored simultaneously by the subscriber device.

8. The subscriber device of claim 6, wherein the communications module operatively coupled to the control module comprises:
the communications module operatively coupled to the control module including at least one transceiver configured to exchange data with at least one medical telematics sensor or at least one home environment sensor.

9. The subscriber device of claim 1, wherein the control module including at least one processing device comprises:
the control module including at least one non-transitory data store, including at least one of the at least one non-transitory data store configured to receive at least some subscriber device data received from a smart phone application or the control module configured to transmit at least some subscriber device data from the at least one non-transitory data store to a smart phone application.

10. The subscriber device of claim 1, wherein the control module including at least one processing device comprises:
the control module including at least one non-transitory data store, the at least one non-transitory data store configured to determine an appropriate recipient of an alert based at least in part on an alert type.

11. The subscriber device of claim 1, further comprising:
at least one residential-facing connection configured for at least one of transmitting data to or receiving data from at least one home automation device.

12. The subscriber device of claim 1, further comprising:
at least one residential-facing connection configured for at least one of transmitting one or more commands operable to unlock a door or transmitting one or more commands operable to turn on a light.

13. The subscriber device of claim 3, wherein the power module operatively coupled to the control module, wherein at least some data associated with the power module is associated with one or more signals to the automated personal emergency response system comprises:
the power module operatively coupled to the control module, wherein at least some data associated with the power module is associated with one or more signals to the automated personal emergency response system, the one or more signals including at least an indication of the power level of the device.

14. The subscriber device of claim 4, wherein the control module including at least one processing device and the positional awareness module operatively coupled to the control module comprise:
the positional awareness module configured to detect, using at least one accelerometer, at least two types of falls by a user of the subscriber device, wherein each of the at least two types of falls is associated with an individual alert event type; and
the control module configured to determine an appropriate recipient of a signal based at least in part on an individual alert event type.

15. The subscriber device of claim 1, wherein the alert button configured to respond to an alert button press by initiating one or more transmissions to the automated personal emergency response system comprises:
the alert button configured to respond to an alert button press by attempting to establish a teleconference with one or more parties associated with the automated personal emergency response system and, if the teleconference with one or more parties associated with the automated personal emergency response system cannot be established, attempting to establish a teleconference with at least one other party.

16. The subscriber device of claim 1, wherein the visual display screen capable of rendering text in at least three colors comprises:
a visual display screen capable of rendering at least one of text or graphics.

17. The subscriber device of claim 1, wherein the alert button configured to respond to an alert button press by initiating one or more transmissions to the automated personal emergency response system comprises:

the alert button configured to respond to an alert button press by initiating one or more transmissions to at least one of a conference bridge, a central monitoring center, or a 911 dispatch.

18. A subscriber device for facilitating communications with a central control center, comprising:
   circuitry configured for rendering messages capable of being viewed by a user of the subscriber device, the messages capable of being rendered in at least three colors;
   circuitry configured for initiating a teleconference for coupling at least the subscriber device and the central control center, the circuitry configured for initiating responsive to a press of an alert button of the subscriber device;
   circuitry configured for exchanging audio communications between a user of the subscriber device and a party associated with the central control center during a successfully-established teleconference;
   circuitry configured for emitting at least one aural voice prompt, the at least one aural voice prompt capable of being emitted by the subscriber device when the subscriber device is at least out of range of one or more wireless networks; and
   circuitry configured for overriding a user volume setting of the subscriber device responsive to a signal received by the subscriber device via one or more wireless networks.

19. The subscriber device of claim 18, wherein the circuitry configured for initiating a teleconference for coupling at least the subscriber device and the central control center, the circuitry configured for initiating responsive to a press of an alert button of the subscriber device comprises:
   circuitry configured for initiating a teleconference for coupling at least the subscriber device and a monitoring service.

20. The subscriber device of claim 18, further comprising:
   circuitry configured for detecting at least one GPS location associated with the subscriber device; and
   circuitry configured for providing at least one detected GPS location to the central control center.

21. A portable computing device, comprising:
   a housing;
   at least one display, the at least one display at least partially visible through the housing of the portable computing device;
   at least one alert button, the at least one alert button at least partially housed by the housing of the portable computing device; and
   at least one speaker, the at least one speaker at least partially housed by the housing of the portable computing device, the at least one speaker associated with a user volume setting capable of being overridden responsive to a signal received by the portable computing device via at least one wireless network;
   at least one microphone, the at least one microphone at least partially housed by the housing of the portable computing device; and
   circuitry configured to at least:
      responsive to a press of at least one alert button, attempt to initiate a teleconference between the portable computing device and one or more parties associated with a personal emergency response system, the teleconference facilitated at least in part via at least one speaker and at least one microphone;
      render at least text in at least three colors via at least one display; and
      provide one or more aural prompts via at least one speaker, the one or more aural prompts capable of being provided at least when the portable computing device is not operatively coupled with at least one wireless network.

22. The portable computing device of claim 21, further comprising:
   circuitry configured to receive at least some configuration data; and
   circuitry configured to alter a configuration of the portable computing device based at least in part on at least some received configuration data.

* * * * *